United States Patent [19]
Gullickson

[11] Patent Number: 5,129,216
[45] Date of Patent: Jul. 14, 1992

[54] CROP BLOWER

[76] Inventor: Zan Gullickson, Box 70, Barons, Alberta, Canada, T0L 0G0

[21] Appl. No.: 668,155

[22] Filed: Mar. 12, 1991

[51] Int. Cl.$^5$ .............................................. A01D 45/20
[52] U.S. Cl. ...................................... 56/12.9; 56/13.4
[58] Field of Search ...................... 56/12.8, 12.9, 13.1, 56/13.4, DIG. 8

[56] References Cited

U.S. PATENT DOCUMENTS

| | | | |
|---|---|---|---|
| 3,165,874 | 1/1965 | Osteen | 56/DIG. 8 X |
| 3,828,531 | 8/1974 | Quick | 56/12.9 |
| 4,914,896 | 4/1990 | Gullickson | 56/12.9 |

Primary Examiner—William P. Neuder
Attorney, Agent, or Firm—Norman M. Cameron

[57] ABSTRACT

A crop blower for a combine harvester. An elongated, tubular housing has a convex outer surface on a first side and a concave outer surface on a second side. There is a fan having a central shaft extending parallel to the housing and spaced-apart from the concave surface thereof. The fan has a plurality of groups of blades. Each group of blades has a plurality of spaced-apart blades which are generally parallel to the shaft and operatively connected thereto. There is a bearing support for the fan mounted on the housing near each end of the housing and between adjacent groups of blades. Each bearing support between adjacent groups of blades includes a U-shaped member extending about the convex surface of the housing. The shaft is rotatably mounted on the bearing supports. There is a motor for rotating the fan and a mount on each end of the housing for mounting the crop blower on a combine harvester.

20 Claims, 5 Drawing Sheets

CROP BLOWER

BACKGROUND OF THE INVENTION

1. Field of the Invention

This invention relates to a crop blower, particularly adapted to replace a conventional bat reel on a combine harvester.

2. Description of Related Art

Crop blowers, also known as pneumatic header attachments or air reels, have been developed to replace conventional bat reels on combine harvesters to improve the cutting action and the crop yield. Some earlier types of crop blowers included a blower mounted to the rear of the combine crop cutting header near the power shaft. The devices were conventionally driven by belts from the power shaft. Typically, a flexible air tube was employed to take air from the blower and forward to a manifold running across and in front of the crop cutting knife. The manifold usually had numerous downspouts which delivered air through nozzles at high speed to direct the crop back into the cutter and then into the auger conveyor. Considerable power was required to provide a sufficient volume and pressure of air to properly direct the crop.

However, some crops or crop conditions required much higher forces than could be obtained from crop blowers of the type described above. For this reason, crop blowers were developed with separate fans, one at each end of the table. However, those apparatuses were relatively expensive, consumed a lot of power and increased the force applied to the crops by only about 35%.

Tangential flow fans, or vortex fans, have been employed in crop blowers as seen for example in U.S. Pat. No. 3,828,531 to Quick. While Quick appears to show a viable means of providing a high volume current of air across the combine header, in fact the apparatus disclosed cannot be employed on many combine harvesters which often have a width exceeding 9 meters. It is simply not feasible to support a 9 meter long fan by bearings located only at the ends of the fan as Quick would suggest.

One solution to this problem is to employ a series of separate fans connected together end to end across the width of the combine harvester as disclosed in U.S. Pat. No. 4,914,896 to M. Roy Gullickson. In this way, intermediate bearing supports are provided for the fan means across the width of the harvester. This patent discloses the use of both conventional centrifugal fans as well as tangential flow or cross-flow fans. The use of a series of separate fans extending across the width of the harvester permits a high volume of air to be applied to the crop, but appreciably reduces the power requirements of the apparatus.

However, while providing significantly improved operation when compared with conventional apparatuses, the invention described in this patent requires relatively heavy structural members to support the tangential flow fans. The resulting apparatus is heavy and difficult and expensive to manufacture. Thus the marketability and acceptability of the product to farmers was somewhat limited.

SUMMARY OF THE INVENTION

The invention overcomes the problems and limitations with the prior art described above by providing a crop blower which has a single member combining the function of a housing or shroud for a fan or a series of fans and a beam or support for the bearings of the fans. In particular, the invention provides a crop blower for a combine harvester which has an elongated tubular housing having opposite ends. There is a convex outer surface on a first side of the housing and a concave outer surface on a second side of the housing which is generally opposite the first side. There is a fan having a central shaft extending parallel to the housing and spaced-apart from the concave surface thereof. The fan has a plurality of groups of fan blades, each said group of blades having a plurality of spaced-apart blades which are generally parallel to the shaft and operatively connected thereto. Bearing supports for the fan are mounted on the housing near each end of the housing and between adjacent groups of the fan blades. Each of the bearing supports between adjacent groups of fan blades may include a U-shaped member extending about the convex surface of the housing. The shaft is rotatably mounted on the bearing supports. There is also a means for rotating the fan and mounting means on each end of the housing for mounting the crop blower on a combine harvester.

Another aspect of the invention provides a crop blower for a combine harvester which includes a housing comprising a single length of tubing which is convexly curved on an upper side thereof and concavely curved on a bottom side thereof. The housing has a front and a back. There is a fan having blades adjacent to the bottom side of the housing and means for rotating the fan so the blades move in a direction towards the front of the housing, over the concave surface and then past the back of the housing, to draw air in at the front of the housing and discharge air at the back of the housing. There is means on the housing for mounting the crop blower on the front of the combine harvester.

Another aspect of the invention provides in combination a combine harvester having a front end with a pair of spaced-apart arms and a crop cutter header extending therebetween and a crop blower mounted on the arms for directing crops towards the header. The crop blower has a tube extending between the arms of the harvester. A fan is mounted on the tube and is supported by the tube between the arms of the harvester.

The invention overcomes deficiencies in the prior art by providing a crop blower which is lighter and simpler in construction. The invention also offers improved performance compared with some prior art devices.

DESCRIPTION OF THE PREFERRED EMBODIMENTS

Figure 1:
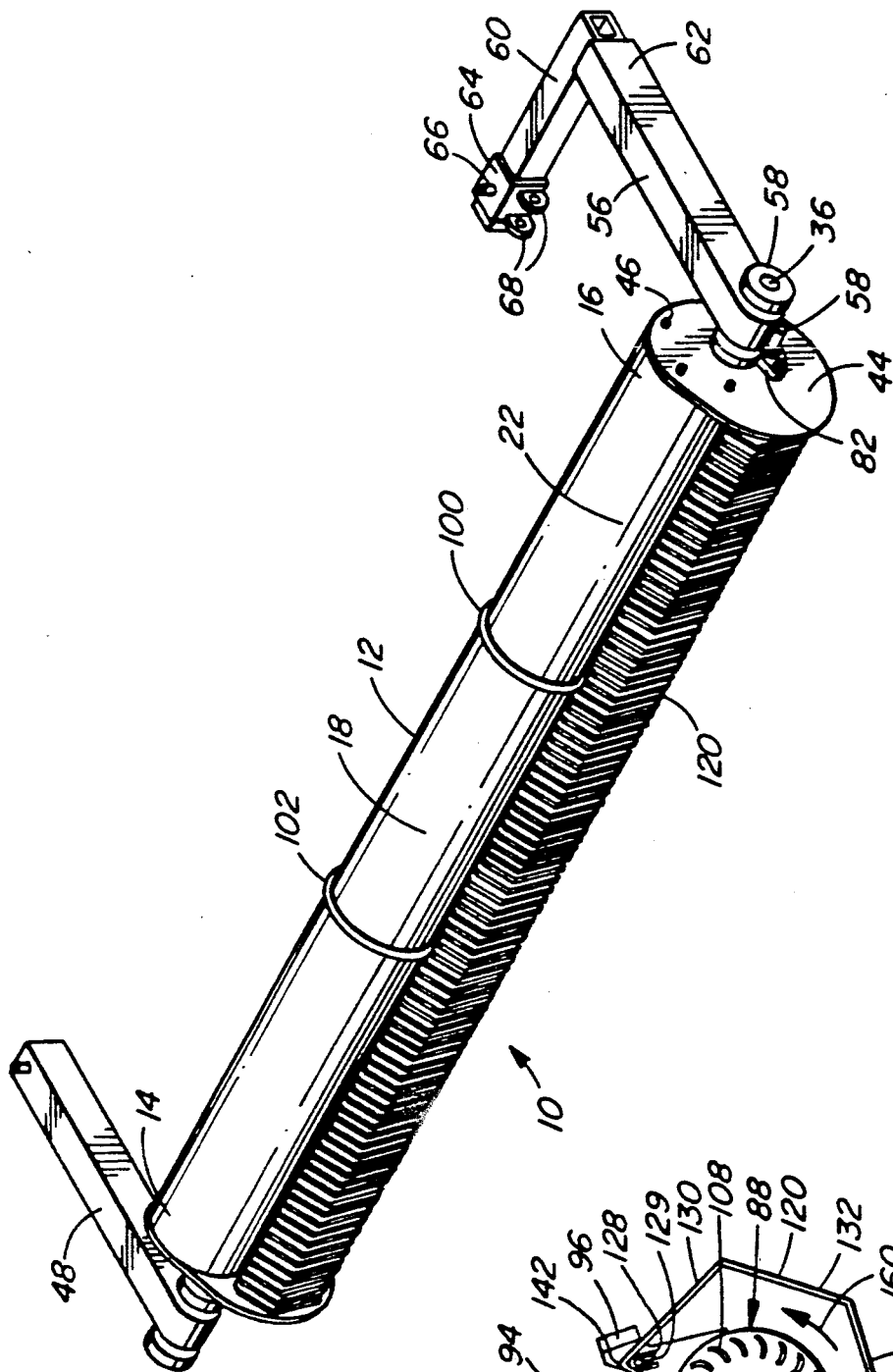
FIG. 1 is a top, front isometric view of a crop blower according to a first embodiment of the invention.
Figure 3:
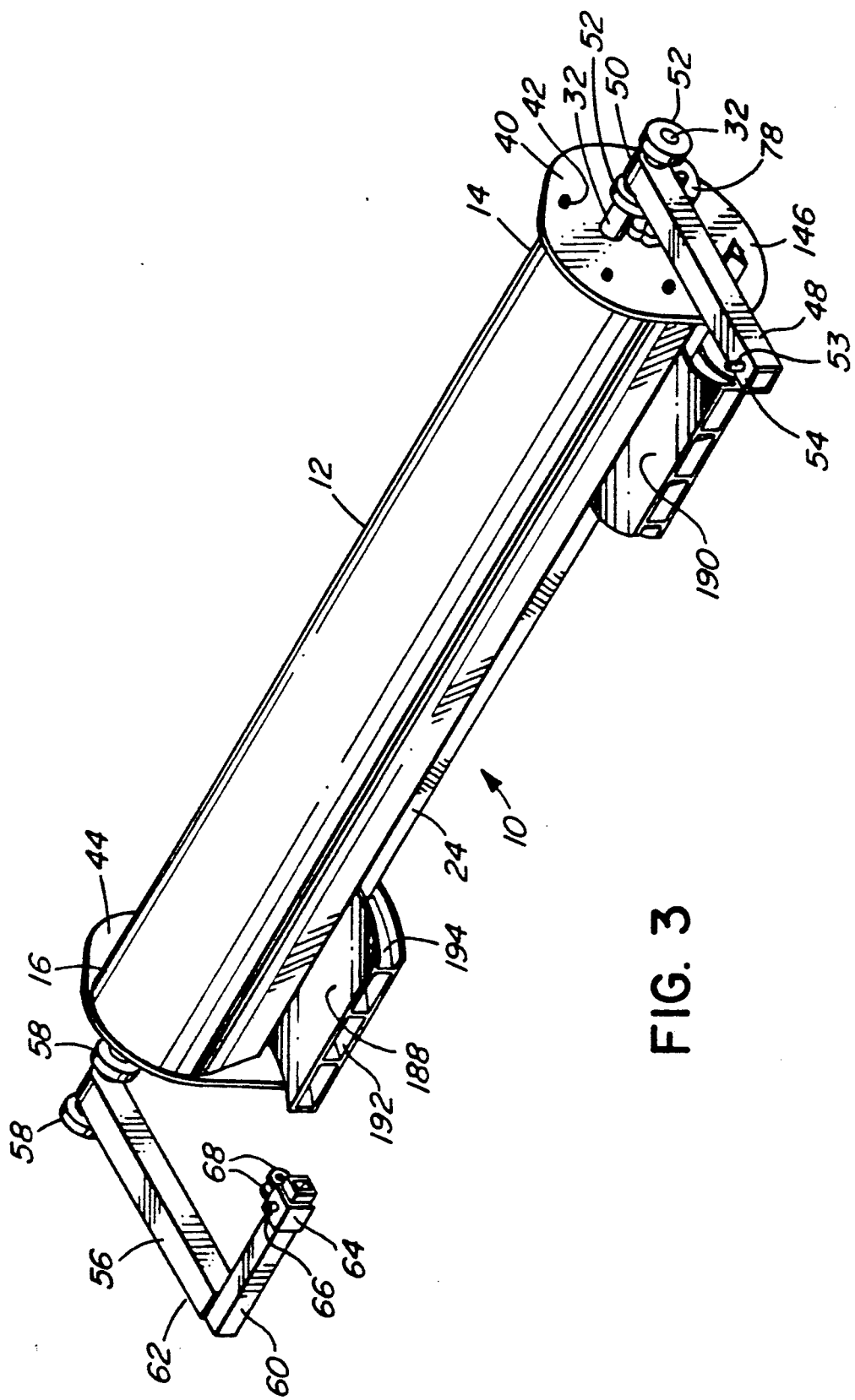
FIG. 3 is a top, rear isometric view of the crop blower of FIG. 1.
Figure 5A:
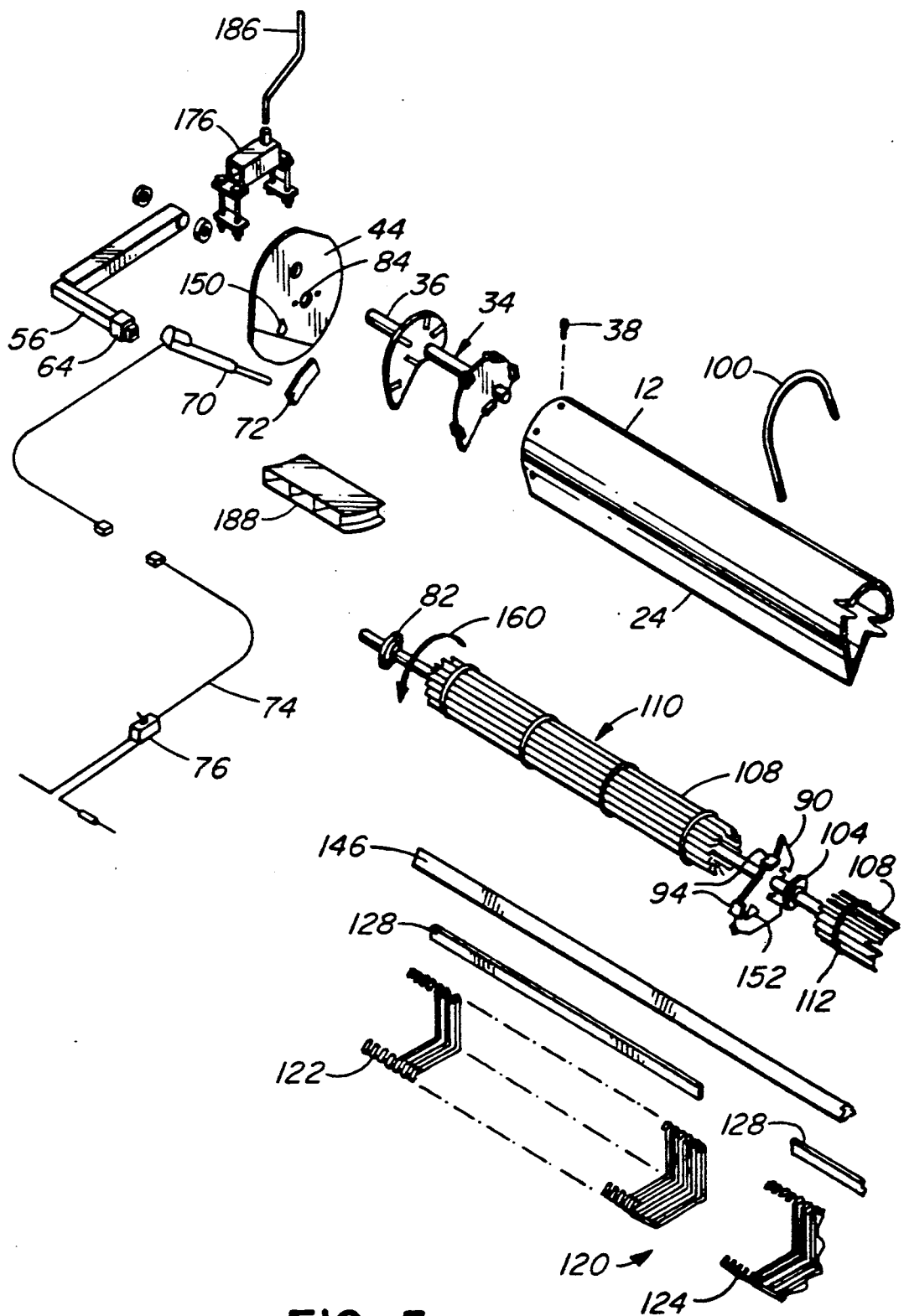
FIG. 5a is an exploded, isometric view showing one half of the crop blower of FIG. 1.
Figure 5B:
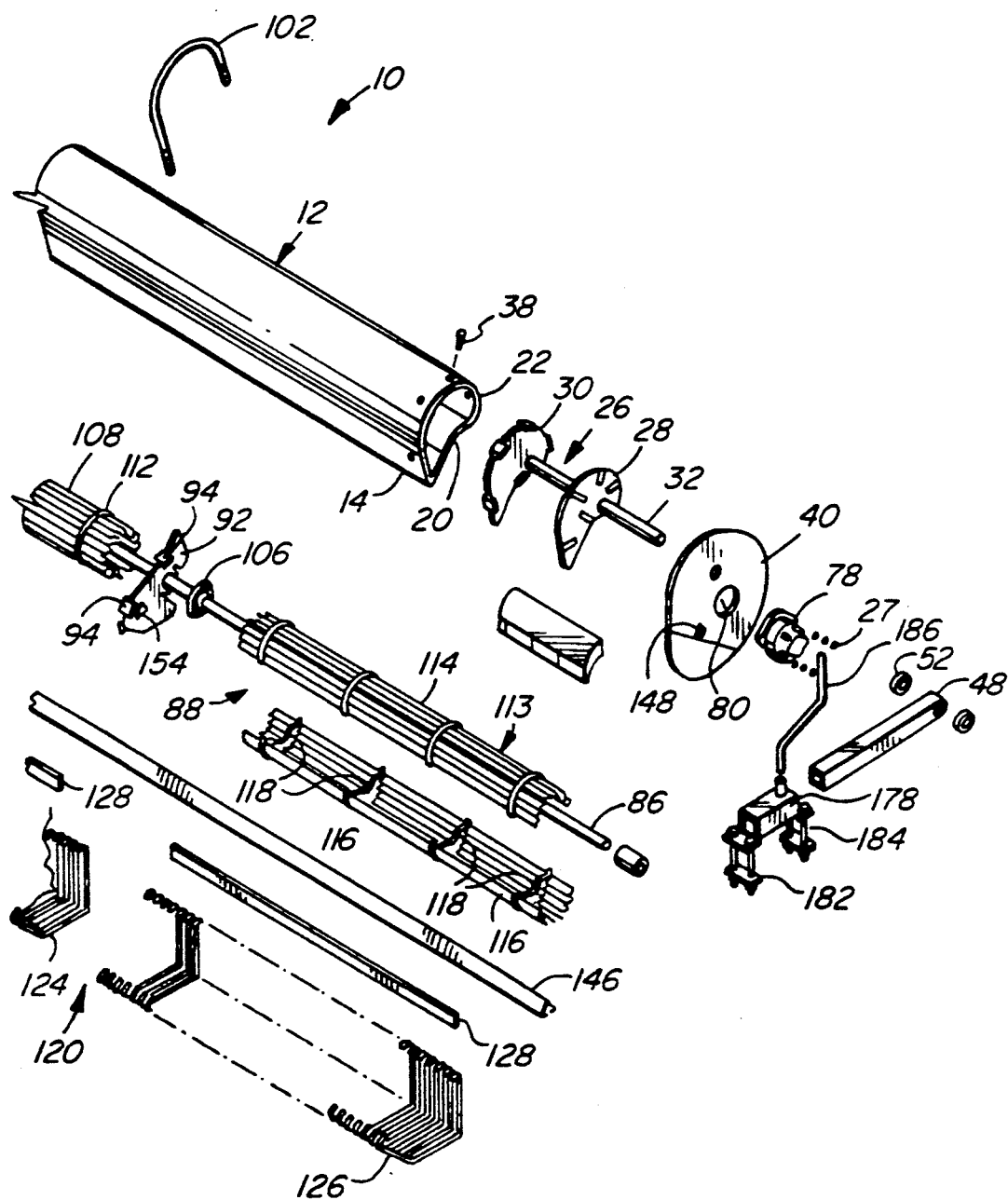
FIG. 5b is a continuation of FIG. 5a showing the other half of the crop blower.

Referring first to FIG. 1, this illustrates a crop blower shown generally at 10. The, crop blower includes an elongated tubular housing or beam 12 having opposite ends 14 and 16. Housing 12 has a convex outer surface 18 on the top side thereof and a concave outer surface 20 on the bottom surface thereof as seen in FIG. 5b. The housing has a convexly curved front edge 22 as shown in FIG. 1 and FIG. 5b and a relatively sharp back edge 24 as shown in FIG. 3 and FIG. 5a. The back edge is positioned below the front edge when the blower is positioned for use as seen in FIG. 5b.

In the preferred embodiment, the housing 12 comprises a single length of aluminum tubing formed by cold rolling. In this particular embodiment tubing of soft temper, 3000 series aluminum with a wall thickness of approximately 2.3 mm. is used, but this is given by way of example only. The initial tubing is round in section approximating the curvature of convex surface 12. The concave bottom surface 20 is gradually formed by rolling the tube through a series of rollers. In this case, a rolling machine with nine groups of driven rollers, or rolling stations, were used. The stations are far enough apart (about 45 cm. in this example) to avoid kinking the tube. The shape of the housing is formed progressively by each station with a limited deformation, about 1 cm. maximum, at each station. A limited degree of over-forming is necessary to yield the correct end result.

As shown only in FIG. 5b, a pair 26 of spaced-apart bulkheads 28 and 30 are located within housing 12 adjacent end 14. The bulkheads are connected by a mounting shaft 32 which extends co-axially with housing 12. The bulkheads have the same shape as an inside section of housing 12, but slightly smaller to fit within the housing. A similar pair 34 of bulkheads is positioned within the tube 12 at the opposite end 16, as seen in FIG. 5a, and are interconnected by a second mounting shaft 36. The outer bulkhead of each pair is connected to housing 12 by a series of bolts 38 extending through apertures in housing 12. In this preferred embodiment, housing 12 is unperforated throughout its length between the apertures for bolts 38. This allows the tube to be light in weight, but strong.

An end plate 40 is fitted over shaft 32 and is bolted to bulkhead 28 by bolts 42 as shown best in FIG. 3. A similar end plate 44 is fitted over shaft 36 at the opposite end 16 of the crop blower and is connected to its bulkhead by bolts 46 as shown best in FIG. 1. Mounting shaft 32 extends rotatably through an aperture in end 50 of mounting arm 48 which is secured in place by a pair of set collars 52 on each side thereof. A set bolt 53 is threadedly received in an aperture in the top of arm 48 adjacent its opposite end 54 as seen in FIG. 3. The mounting arm is made of a length of square tubing in this preferred embodiment.

A second mounting arm 56 is located at the opposite end of the crop blower and is fitted over shaft 36 and held in place by a pair of set collars 58. Arm 56 is L-shaped, having a member 60 extending inwardly and parallel to housing 12 adjacent end 62 of the arm. An actuator collar 64 is fitted over member 60 and is held in the desired position by a set bolt 66 shown in FIG. 1. A pair of spaced-apart mounting lugs 68 are connected to actuator collar 64 on the side facing housing 12. These serve as a mount for one end of an electrical actuator 70 shown only in FIG. 5a. The opposite end of the actuator is connected to an actuator brace 72 which is bolted to end plate 44. Wiring harness 74 of the actuator is provided with a switch 76, normally accessable from inside the cab of a harvester, to retract or extend the electrical actuator and thereby rotate housing 12, end plates 40 and 44 and the related assembly about an axis extending through shafts 32 and 36.

Figure 4:
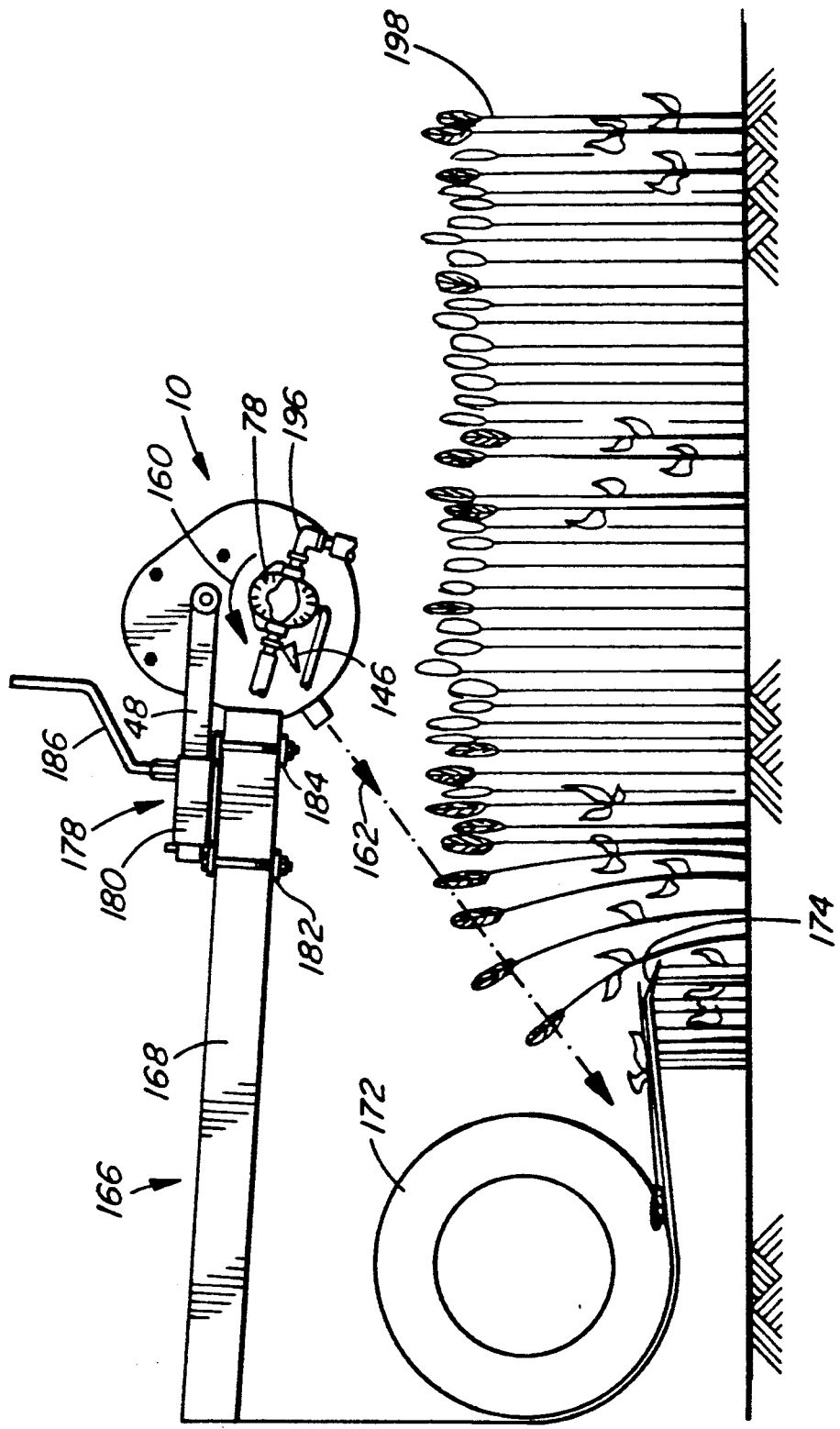
FIG. 4 is a side elevation of the crop blower of FIG. 1 in combination with a combine harvester, shown in fragment in the process of directing a crop towards the cutter header of the harvester.

An hydraulic motor 78, shown in FIG. 3, 4 and 5b is bolted to end plate 40 over aperture 80 shown in FIG. 5b. A bearing 82, best shown in FIG. 1, is bolted on end plate 44 over aperture 84 therein shown in FIG. 5b.

Figure 2:
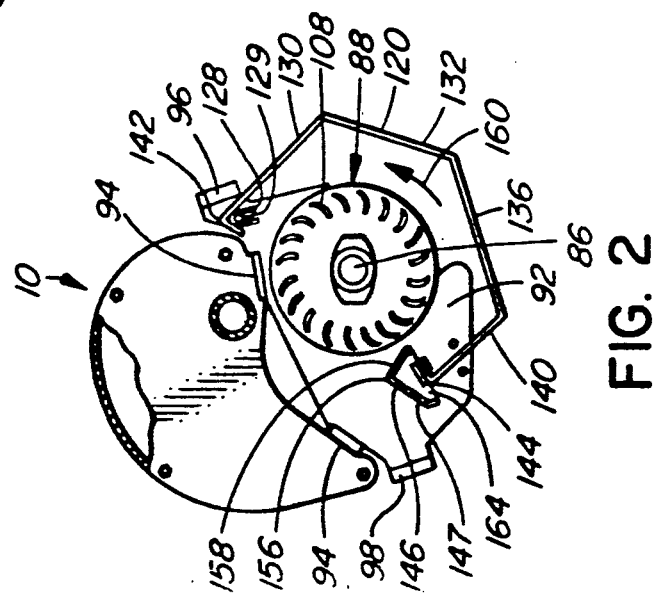
FIG. 2 is an elevation, partly in section, of the crop blower of FIG. 1.

A pair of spaced-apart mounts 90 and 92, shown in FIG. 5a and 5b, and mount 92 also shown in FIG. 2, are fitted below tube 12. The number of mounts depends on the length of the crop blower. In this example, the maximum span between mounts is about 117 cm. The mounts are a metal plate with metal pads 94 for contacting the bottom of housing 12. The mounts have small diameter tubes 96 and 98 connected to the front and back thereof by welding or other suitable means as seen in FIG. 2. A pair of U-bolts 100 and 102 shown in FIG. 1, 5a and 5b extend over the top of housing 12 with the ends thereof fitted through the tubes 96 and 98 of the mounts 90 and 92 and secured tightly thereto by nuts threadedly engaging the ends of the bolts.

Bearings 104 and 106 are bolted to the mounts 90 and 92 respectively. Bearings 82, 104 and 106 rotatably receive and support drive shaft 86 of a fan shown generally at 88 in FIG. 2 and 5b. The hydraulic motor 78 is operatively connected to the end of shaft 86 opposite bearing 82. The drive shaft may be a single length or interconnected sections.

The fan 88 has a plurality of blades 108 which extend parallel to shaft 86 and are spaced-apart therefrom. The fan blades are circumferentially spaced-apart about the shaft as best seen in FIG. 2. It may be seen that the blades are flat members which are concave on one side and convex on the other. In this embodiment, the fan blades are in three sections 110, 112 and 113 shown in FIG. 5a and 5b. Section 110 is between bearings 82 and 104. Section 112 is between bearing 104 and bearing 106. Section 113 is between bearing 106 and hydraulic motor 78. Each section of fan blades is in two halves 114 and 116 as shown for section 113 in FIG. 5b. Each half of the section is connected to a series of semi-circular bulkheads 118, each having a semi-circular recess for fitting about shaft 86. The halves 114 and 116 are bolted together about the shaft to provide a cylindrical arrangement of fan blades.

For safety purposes, a grill 120 is fitted about the front of the fan 88 below housing 12. As seen in FIG. 5a and 5b, the grill 120 in this embodiment is in three sections 122, 124 and 126. Section 122 is between end plate 44 and mount 90, section 124 is between mount 90 and mount 92, and section 126 is between mount 92 and end plate 40. Each section of the grill is mounted at the front over a grill brace 128. As seen best in FIG. 2, each of the grill braces 128 is an inverted U-shape in section and fits over pins 129 on the end plates and mounts. The grill 120 has four contiguous sides 130, 132, 136 and 140 with adjacent sides meeting at oblique angles so that the grill fits about the fan as seen in FIG. 2. The sides 130 and 140 have acute angle bends 142 and 144 near the distal ends thereof. Bend 142 extends about grill braces 128 to mount the grill at the front end. The grill is bent so that sides 130 and 140 must be pulled apart slightly to install the grill. Once installed, its own spring tension holds the grill in place.

At the rear end, each section of the grill is connected to vortex stabilizer 146 shown best in FIG. 2, 5a and 5b. The vortex stabilizer is substantially coextensive with housing 12, having opposite ends fitting through apertures 148 and 150 in end plates 40 and 44 as seen in FIG. 5b and 5a respectively. The vortex stabilizer also fits through apertures 152 and 154 in mounts 90 and 92 respectively. There is a slot like opening 164 in the vortex stabilizer which allows insertion of the upper portion of side 140 of grill 120 which is then secured to the vortex stabilizer by suitable means such as bolts spaced-apart along the length thereof.

As seen best in FIG. 2, the vortex stabilizer in this example is of extruded aluminum which is a rectilinear triangle in cross section. There is a right angle corner 156 and a base 158. FIG. 2 illustrates the orientation of the vortex stabilizer in use where the right angle corner 156 forms an upper apex of the triangle and the base is angled downwardly and acutely with respect with the outer periphery of fan 88. Side 147 of the vortex stabilizer is generally parallel with the opposing concave surface 20 of housing 12.

The direction of rotation of the fan 88 caused by hydraulic motor 78 is shown by arrows 160 in FIG. 2 and 5a. It may be observed, particularly with reference to FIG. 5a and 5b, that the fan is rotated in a direction such that the blades 108 pass from the front, concave edge 22 of housing 12, over the concave bottom surface 20 thereof to the back edge 24. Thus air is drawn in through the grill 120 and is discharged by the fan blades below back edge 24 of the housing 12.

The discharge of air from the fan occurs at the rear of the fan in a downwardly angled direction. A vortex is formed along the length of the rotating fan 88. The vortex stabilizer fixes the position of the vortex and deflects the discharge of air in the desired direction as indicated by the arrows 162 in FIG. 4.

FIG. 4 shows the mounting of the crop blower on a combine harvester shown generally and in fragment at 166. This typical harvester has a pair of spaced-apart arms 168, only one of which can be seen in this drawing. The arm on the opposite side is identical. The arms can be raised or lowered hydraulically by the conventional hydraulic actuators forming part of the harvester. A cutter head 174 extends between the arms and below the arms. The cutter head 174 is in front of an auger 172 at the bottom thereof.

The crop blower includes a pair of identical mounting brackets 176 and 178 shown in FIG. 5a and 5b. Referring to FIG. 4, which shows bracket 178 in better detail, each bracket in this particular example of the invention includes a length of square tube 180 having an inside cross-section slightly larger than the outside section of the mounting arms 48 and 56 so as to slidably receive the same. A pair of clamps 182 and 184 are connected to the bottom of the tube 180. These clamps include pads above and below which can be tightened together by spaced-apart bolts to secure tube 180 to one of the harvester arms.

A clamp screw 186 having a crank-shaped upper portion is threadedly received on a nut secured to the top of tubing 180 above an aperture therein, by welding in this example. Thus the threaded lower end of each of the clamp screws can engage the mounting arms 48 and 56 to fixedly secure the crop blower thereto. The clamp screws can be released to permit adjustments of the position of the crop blower back and forth in the longitudinal direction of the arms 168 so that the crop is properly directed towards the cutter head 174.

The cutter head may be somewhat longer than the crop blower 10. Because of this, and to assure that the crop adjacent the ends of the cutter head is properly fed into the harvester, the crop blower is provided with a pair of end air deflectors 188 and 190 shown best in FIG. 3. In this example, each end air deflector is held in place by two bolts, one through the vortex stabilizer 146 and one through one of the end plates 40 or 44.

As may be seen in FIG. 3, each of the air end deflectors is box-like in construction, having a slot-like opening 192 in the back thereof as shown for deflector 188. A plurality of vanes, in this case four vanes 194, extend from the front to the back of the air deflectors. The vanes are curved outwardly towards the ends of the combine table to deflect air from the fan towards the crop and towards the ends of the table.

OPERATION

The operation of the crop blower is best described with reference to FIG. 3 and 4. The crop blower is mounted on the arms 168 of the combine harvester 166 employing the mounting brackets 176 (shown only in FIG. 5a) and 178. Hydraulic line 196 for motor 78 is connected to the hydraulic system of the harvester normally used for the bat reel. The blower is adjusted along the arms 168 so that the air is directed towards the cutter head as shown by arrows 162. The crop 198 being harvested is thereby deflected against the cutter head 174 and then into the auger 172.

The arms 168 of the harvester are initially moved up or down using the hydraulic cylinders attached thereto (not shown), so that the bottom of the crop blower is approximately 5 cm. to 15 cm. above the top of the crop 198. When a light crop is being harvested, the crop blower should be positioned closer to the cutter head 174 employing clamp screws 186. Conversely, the crop blower could be moved further away by extending mounting arms 48 and 56 after loosening the clamp screws.

The speed of the fan 88 in this particular embodiment is designed to be below 2,000 RPM. Most crops require fan speeds of 600–1,200 RPM while heavy or weed-filled crops may require speeds of 1,200–1,800 RPM. Only enough air should be used to move the crop from the cutter head to the auger. The air flow should be aimed at the cutter head or the upper portion of the crop being cut. The air from the crop blower must hit the crop before it is contacted by the cutter head.

If grain falls away from the cutter head or if the grain reaches the auger butt end first, the air flow must be adjusted. This can be done by moving the crop blower back and forth employing clamp screws 186, by moving the arms 168 up and down employing the hydraulic cylinders of the harvester, or by changing the rotational angle of the crop blower about mounting shafts 32 and 36 employing electrical actuator 70 shown in FIG. 5a.

When used for high yielding crops or where crop conditions require the cutting of a lot of straw to get all of the heads of the grain, the technique is to get the straw to tip head first into the auger as shown in FIG. 4. This is done by raising the arms 168 higher than for light crops. It may also be necessary to tip the crop blower using actuator 70 so it points down less than for light crops. Higher fan speeds may be required for heavy crops.

For tall leaning crops, the crop blower should be moved as far away from the cutter head as possible and lowered as much as possible with the bottom of the crop blower just above the top of the crop. The angle of the crop blower should be reduced so that the air is aimed as horizontally as possible so that the crop is lifted and blown back before the cutter blade contacts the crop. A higher fan speed may be required than for other crops.

When harvesting specialty crops, such as lentils, where a floating cutter-bar is used, the arms 168 should be lowered so the air flow from the crop blower will be level with the guards or slightly below them. The air is directed upwards along the slope of the floating cutter-bar (for Massey (T.M.) headers in particular).

As will be apparent to those skilled in the art, many of the details provided above are by way of example only. The scope of the invention is not to be restricted thereby, but is to be interpreted with reference to the following claims.

What is claimed is:

1. A crop blower for a combine harvester, the crop blower having opposite ends and comprising:
    a fan having a drive shaft, a plurality of groups of blades, each said group of blades having a plurality of spaced-apart blades which are generally parallel to the shaft and operatively connected thereto;
    an elongated tubular housing extending parallel tot eh drive shaft and serving both as a beam supporting the blower between the ends thereof and as a shroud for the fan, the housing having opposite ends, a concave outer surface on a first side which faces the fan and acts as the shroud, and a second convex side which is generally opposite the first side;
    a bearing support for the fan mounted on the housing near each end of the housing and between adjacent said groups of blades, each said bearing support adjacent said groups of blades including a U-shaped member extending about the convex surface of the housing, the shaft being rotatably mounted on the bearing supports;
    means for rotating the fan; and
    mounting means on each said end of the housing for mounting the crop blower on a combine harvester.

2. A crop blower as claimed in claim 1, wherein the means for rotating is an hydraulic motor coupled to the shaft.

3. A crop blower as claimed in claim 1, wherein the crop blower has a top, a front and a back which faces the combine harvester in use, the housing being at the top of the crop blower and the concave surface being on the bottom of the housing and extending from a front edge at the front of the blower to a back edge at the back of the blower, the back edge being below the front edge, the fan being below the housing and being rotatable by the means for rotating in a direction such that the blades of the fan pass from the front edge of the housing, over the concave surface to the back edge thereof so air is drawn in by the fan at the front of the crop blower and is discharged at the back thereof in a downwardly angled direction.

4. A crop blower as claimed in claim 3, wherein the blower includes a deflector means adjacent each said end of the housing for deflecting air from the fan outwardly beyond the ends of the housing.

5. A crop blower as claimed in claim 4, wherein the deflector means includes angled vanes.

6. A crop blower as claimed in claim 3, wherein a vortex stabilizer is mounted on the back of the blower adjacent the fan and is positioned to be in a stream of air discharged from the fan, the stabilizer being an elongated member extending parallel to the shaft of the fan.

7. A crop blower as claimed in claim 6, wherein the stabilizer is generally triangular in section.

8. A crop blower as claimed in claim 6, wherein the stabilizer is a rectilinear triangle in section, having a right angle forming an upper apex and a base angled downwardly and acutely with respect to the outer periphery of the fan blades.

9. A crop blower as claimed in claim 1, wherein the blades are thin members with concave surfaces on one side and convex surfaces on a side opposite the one side.

10. A crop blower as claimed in claim 3, further comprising a grill operatively connected to the housing and extending over the fan at the front of the crop blower.

11. A crop blower as claimed in claim 1, wherein the housing is a single piece of tubing.

12. A crop blower as claimed in claim 11, wherein the housing is of aluminum.

13. A crop blower for a combine harvester, the crop blower having opposite ends and comprising:
    a fan extending between the ends of the blower;
    a housing comprising a single length of tubing which is convexly curved on an upper side thereof and concavely curved on a bottom side thereof, the housing having a front and a back and serving both as a beam which supports the blower between its ends and as a shroud for the fan, the bottom side extending partially about the fan;
    means for rotating the fan so the blades move in a direction from the front of the housing, over the concave surface and then past the back of the housing to draw air in at the front of the housing and discharge air at the back of the housing; and
    means on the housing for mounting the crop blower on the front of a combine harvester.

14. A crop blower as claimed in claim 13, wherein the housing is of rolled aluminum tubing.

15. A crop blower as claimed in claim 13, wherein the housing has a convexly curved front and a back edge which is relatively sharp compared to the front edge, the back edge pointing rearwardly and downwardly in use.

16. A crop blower as claimed in claim 13, wherein the fan blades are in groups separated by bearings for supporting the fan, the blower including supports for the bearings mounted on the housing.

17. A crop blower as claimed in claim 16, wherein the supports are mounted on the housing by U-shaped members extending about the housing.

18. In combination:
    a combine harvester having a front end with a pair of spaced-apart arms and a crop cutting header therebetween; and
    a crop blower mounted on the arms for directing crop towards the header, the crop blower having a tube extending between the arms of the harvester, the tube having a concave bottom, and a fan mounted on the tube, the fan being supported by the tube between the arms of the harvester and the bottom of the tube forming a shroud for the fan.

19. A combination as claimed in claim 18, wherein the fan has a shaft extending parallel to the tube, a bearing for supporting the shaft adjacent each of the arms of the harvester, at least one bearing for the shaft between the arms, and a plurality of blades extending along the shaft between the bearings, the crop blower including a support for said bearing between the arms, said support being mounted on the tube.

20. A combination as claimed in claim 19, wherein the support includes a U-shaped member extending about the tube.

* * * * *